United States Patent

Hausslein et al.

[15] 3,655,432

[45] Apr. 11, 1972

[54] ABRASION RESISTANT COATING OF POLYETHER POLYURETHANE

[72] Inventors: Robert W. Hausslein, Lexington; Henry E. Molvar, Jr., Billerica, both of Mass.

[73] Assignee: Amicon Corporation, Lexington, Mass.

[22] Filed: May 2, 1969

[21] Appl. No.: 821,472

[52] U.S. Cl. ............. 117/138.8 F, 117/33.3, 117/138.8 UA, 117/145, 117/161 KP
[51] Int. Cl. .................. B44d 5/00, B32b 27/08, B32b 23/08
[58] Field of Search .................... 117/161 KP, 138.8 U, 33.3, 117/145; 260/77.5 CH, 77.5 AP, 77.5 AM

[56] References Cited

UNITED STATES PATENTS

| | | | |
|---|---|---|---|
| 3,069,287 | 12/1962 | Hudson | 117/161 KP |
| 3,124,605 | 3/1964 | Wagner | 260/77.5 CH |
| 3,392,183 | 7/1968 | Windemuth et al. | 117/161 KP |
| 3,458,348 | 7/1969 | Sherman | 117/138.8 U |
| 3,538,027 | 11/1970 | Stein et al. | 117/161 KP |

*Primary Examiner*—William D. Martin
*Assistant Examiner*—Sadie L. Childs
*Attorney*—R. W. Furlong

[57] ABSTRACT

Abrasion resistant coatings for use on plastic articles which coatings are the cured reaction products formed of (1) a polyfunctional biuret formed of an aliphatic diisocyanate and water and (2) a polyethylene glycol. Plastic articles include acrylic, cellulose propionate and polycarbonate substrates. Preferred embodiments of the invention are those containing little or no solvent.

5 Claims, No Drawings

ABRASION RESISTANT COATING OF POLYETHER POLYURETHANE

BACKGROUND OF THE INVENTION

It has long been a problem in the art to provide suitable glass substitutes for use in optical lenses, mirrors or windows which are subject to intentional or accidental stresses from thrown objects, heavy vibrations, sonic booms and the like. It has also been a problem to provide plastic articles which have good impact strength and also exhibit sufficiently good chemical resistance, abrasion resistance and thermal resistance in a wide variety of environments that the articles can be used in such applications as windows, large advertising display signs, and the like. Among the more important plastics used in such articles are acrylic resins and polycarbonate resins.

For some time, it has been known that objects formed of the thermoplastic aromatic polycarbonate resins have the requisite impact resistance to be used as windows and the like. However, the number of applications in which polycarbonate articles could be successfully used would be far greater if a means were found to increase the aforementioned chemical and abrasion resistances of the thermoplastic. In particular, it is important to provide chemical resistance against yellowing which results from exposure to ultra-violet radiation, to provide resistance to hydrolysis, and to provide resistance to attack by solvents which may be used to clean paint off the plastic. However, in achieving improved properties of such articles, it is important to maintain the excellent impact and optical character thereof. This is not easily achieved because most plastic substrates are susceptible to either long-term or short-term degradation by the solvent vehicles which are the most convenient vehicles for the candidate coatings known in the prior art.

Although some coatings have been suggested in the art for use on polycarbonates, e.g. the reaction product of organic polyisocyanates with hydroxyl polyesters described in U.S. Pat. No. 3,069,287 to Hudson, such coatings require use of an acid cleaning of the plastic substrate before they are applied and such coatings contain solvents which are harmful to most plastic substrates.

SUMMARY OF THE INVENTION

Therefore, it is a principal object of the invention to provide a process whereby plastic articles such as sheet, lenses, or mirrors can be modified to have chemically resistant and abrasion-resistant surfaces without detracting from the other desirable attributes of the articles.

It is another object of the invention to provide optically-clear coating compositions of improved chemical resistance and abrasion resistance, which are useful on plastic substrates such as acrylic, cellulosic, and polycarbonate substrates.

Another object of the invention is to provide novel plastic articles comprising an impact resistant substrate and a coating of excellent chemical resistance and abrasion resistance.

Another object of the invention is to provide a solvent-free coating composition having the aforesaid chemical and abrasion resistance which coating composition will result in suitable adherence of the resultant coating to a plastic substrate without the necessity of rigorous cleaning procedures.

Another object of the invention is to localize UV screening-agents (that protect the substrate) on the surface of the substrate where they do the most good, rather than require that they be blended into the interior, where they also might detract from physical properties.

Another object of the invention is to provide improved non-yellowing coatings for adherence to plastic substrates.

A further object of the invention is to provide an improved coating composition comprising an aliphatic polyether polyol and a biuret compound formed of a polyfunctional aliphatic isocyanate and water.

Other objects of the invention will be obvious to those skilled in the art on reading this application.

The above objects have been substantially achieved by the formulation of coating materials which are primarily a mixture containing controlled proportions of (1) a biuret compound formed of an aliphatic polyisocyanate and a condensing agent such as water and (2) selected polyethylene glycol ethers having a molecular weight of from 300 to about 1,200. These coatings contain minimal quantities, i.e. quantities below about 10 percent by weight of organic solvent vehicles. In the most advantageous embodiments of the invention, no substantial quantity of solvent is used. When solvents are used, they should be selected from those characterized by moderate volatility and moderate polarity. In its most favorable embodiments, the composition of the invention also contains small quantities of such adjuvants as ultraviolet stabilizers and levelling control additives. This approach to, and solution of, the problems posed by the prior art is believed to be particularly surprising in view of the fact that it has heretofore been thought that coatings based on polyethylene glycols would have poor resistance to hydrolytic fission under warm and humid conditions.

Normally the polyether polyols formed of butylene oxide, or tetrahydrofuran have been utilized in forming more moisture resistant compositions in the past. It is even more surprising that the relatively high molecular weight polyethylene glycol ethers (such as those having average molecular weights of 400 to 1,200 or higher), can provide coatings of good water resistance and mar resistance because of the relatively few hydroxy groups thereon to provide crosslinking with the isocyanate compound.

Other aliphatic polyether polyols useful in the process of the invention include a wide variety of diols, triols, tetrols, and mixtures thereof containing polyethylene ether groups between the hydroxyl groups. It is also permissible to have some aromatic, cycloaliphatic and substantially branched aliphatic groups in the molecular segments between the hydroxyl groups; however, such groups are generally undesirable because they tend to reduce the flexibility of the final material. Therefore, the hydrocarbon segments of preferred polyols are substantially aliphatic and without substantial chain branching.

The aliphatic polyisocyanate compounds useful in the formulation of the coatings are biuret compounds formed by the condensation of an aliphatic diisocyanate with a condensing agent such as water to form trifunctional aliphatic polyisocyanate compound having an isocyanate (NCO) equivalent weight of from about 75 to about 300. Materials which are liquids at room temperatures are favored inasmuch as they may be compounded and coated under more convenient conditions. The condensation product of hexamethylene diisocyanate, and for example, water is particularly useful in the practice of the invention. Although usually sold in a solvent vehicle under the trade designation Desmodur N, the preferred "100 percent solids" material (also a liquid) can be obtained from Mobay Chemical Company.

The ratio of polyisocyanate reactant to the polyether polyol reactant is preferably chosen to yield a ratio of hydroxyl groups to isocyanate groups of about 1 to 1, but small excesses of either reacting group, e.g. up to about 10 percent may be tolerated.

The reaction between the primary reactants may be suitably catalyzed by an effective quantity of a catalyst such as dibutyl tin dilaurate.

Among the more important modifying ingredients used in the formulation of the coatings of the invention is a levelling agent, e.g., an unmodified urea-formaldehyde resin syrup, which also has been observed to have the desirable attribute of improving the adhesion of the coating composition to plastic substrates. One such levelling agent is that sold under the trade designation Beetle Resin 216–8 as an approximately 60 percent-solids solution. About 0.5–5 percent of this solution, based on the total weight of the coating composition formulation, has been found to yield optimum results.

When the compositions are to be used as clear coatings in applications in which they are exposed to ultraviolet light and the like, they should contain effective quantities of ultraviolet stabilizers against ultraviolet-induced degradation and discoloring reactions. The coating compositions of the invention are particularly advantageous in that such very substantial quantities of stabilizers are compatible therewith and can be added easily thereto. Stabilizer levels of 5 percent by weight, based on the total weight of the solvent-free coating composition, are easily achieved. The stabilizer sold under the trade designation Cyasorb UV531 by American Cyanamid Company is one such useful ultraviolet stabilizer.

Compositions prepared according to the invention have very good abrasion resistance as measured by ASTM D673 and other such abrasion tests known in various arts. For example, the loss of gloss is a magnitude lower for polycarbonate sheet coated with a cured composition according to the invention than it is for untreated polycarbonate sheet. Moreover, the chemical resistance of the treated sheet is excellent with respect to chlorinated solvents like carbon tetrachloride, methylene dichloride and the like; with respect to alkanes such as gasoline; with respect to alcohols such as methanol; and with respect to paints. The coatings have good resistance to acetone. Uncoated polycarbonate sheet has very poor resistance to all of these solvents.

Moreover, the coated articles of the invention show very little yellowing effect when aged for 70 hours at 130° C. even when such aging is carried out without stabilizers incorporated into the coating compositions.

No decrease in the impact strength of the substrate is noted in sheet coated according to the invention as is noted in the case of some coating materials which, on being impacted, tend to propagate cracks through the coating and thence directly into the polycarbonate substrate. Moreover, good thermoformability is still possessed by sheet coated according to the invention.

The compositions of the invention are conveniently formed by mixing all the liquid materials at room temperatures. The composition is conveniently degassed before being coated on a substrate, but this step can be dispensed with when coatings from 1 to 3 mils thick are being spread at ordinary ambient temperatures and at moderate drawdown rates. Curing temperatures of 70° C. are suitable and cures at this temperature can be completed within a few hours.

ILLUSTRATIVE EXAMPLES OF THE INVENTION

In order to point out more fully the nature of the present invention, the following specific examples are given as an illustrative embodiment of the present process and products produced thereby.

WORKING EXAMPLE 1

A quantity of 5 parts by weight of an aliphatic polyisocyanate, believed to be a water condensation product of hexamethylene diisocyanate characterized by 22 percent by weight of isocyanate (NCO) groups and sold under the trade designation "Desmodur N- 100 percent-solids" by Mobay Chemical Company is mixed with 7.5 parts by weight of a polyethylene glycol having an average molecular weight of 600 and sold under the trade designation PEG 600 by Union Carbide Corporation, and 2.0 parts by weight of a urea-formaldehyde resin solution containing about 60 parts solids and 40 percent by weight of a butanol-xylol solvent vehicle sold under the tradename Beetle 216–8 by American Cyanamid.

These ingredients, all liquids, were thoroughly mixed at 30° C. Thereupon coatings of the mixture were drawn down at 1.0 mil thickness settings by use of a gardner Draw-down bar on cellulose propionate sheet and cured at 80° C. overnight. The resultant coating was uniform, had good mar resistance, excellent thermoformability and no blocking tendency.

Samples of the coated sheets were immersed in tapwater at room temperature. After 1 week, the films were intact and showed no deterioration of transparency, toughness, or adhesion.

WORKING EXAMPLE 2

The steps of Example 1 were repeated using 10.0 parts by weight of the Desmodur N-100 percent solids, 0.3 part by weight of the urea-formaldehyde resin solution, and 10 parts by weight of a polyethylene glycol having an average molecular weight of about 400. When coated on cellulose propionate sheet, this coating showed somewhat better mar resistance properties but somewhat poorer thermoformability.

WORKING EXAMPLE 3

The steps of Example 2 are repeated using polycarbonate and poly (methyl methacrylate) sheets as a substrate. Excellent adhesion, mar-resistance, and chemical resistance are thereby imparted to the surface of the plastic sheets.

It is of course to be understood that the forgoing examples are intended to be illustrative and that numerous changes can be made in reactants, proportions, and conditions set forth therein without departing from the spirit of the invention as defined in the appended claims. In particular it is pointed out that acrylic resins such as poly(methyl methacrylate and the modified acrylic resins such as the copolymers of poly(methyl methacrylate) and styrene or methylstyrene and the like may be advantageously coated according to the process of the invention. Polyacetals, nylons, polystyrene and polyvinyl chloride are further examples of materials which can be used in combination with the novel coating compositions of the invention to provide plastic articles of improved properties.

Indeed the utility of the coating compositions of the invention is not limited to the coating of plastics, but may be advantageously extended to the coating of such ceramics as glass and porcelain, to thermosetting plastics like diallylphthalate compounds, polyester and alkyd molding materials and compound; epoxy resins, polyurethanes, phenolics and the like.

What is claimed is:

1. An article of manufacture comprising a polymeric substrate selected from the group consisting of acrylic, cellulose propionate and polycarbonate articles and an abrasion resistant coating thereover comprising the reaction product of a mixture of (1) polyethylene glycol having a molecular weight from 300 to 1,200 and (2) a biuret product of an aliphatic isocyanate and water having an isocyanate equivalent weight from 75 to 300, the ratio of isocyanate groups to hydroxyl groups in said mixture being about 1:1.

2. An article as defined in claim 1 wherein said substrate is formed of a polycarbonate resin.

3. An article as defined in claim 1 wherein said substrate is formed of an acrylic resin.

4. An article as defined in claim 1 wherein said isocyanate is hexamethylene diisocyanate.

5. The article as defined in claim 1 wherein said polyethylene glycol has a hydroxyl equivalent weight from about 100 to about 400.

* * * * *